Sept. 5, 1939.  W. LANGE  2,172,166
MEASURING INSTRUMENT
Filed March 8, 1938
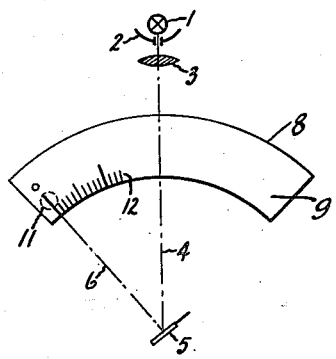
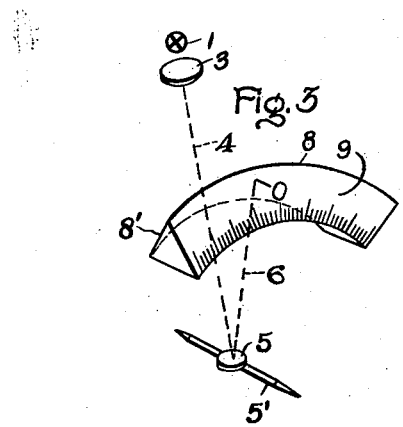
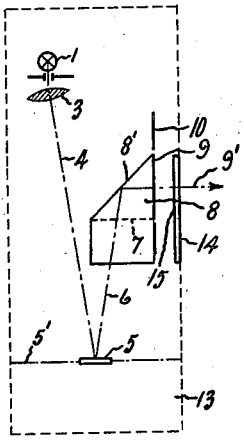
Inventor:
Walter Lange,
by Harry E. Dunham
His Attorney.

Patented Sept. 5, 1939

2,172,166

UNITED STATES PATENT OFFICE 2,172,166

MEASURING INSTRUMENT

Walter Lange, Berlin-Treptow, Germany, assignor to General Electric Company, a corporation of New York Application March 8, 1938, Serial No. 194,670
In Germany March 19, 1937

4 Claims. (Cl. 116—114)

My invention relates to measuring instruments and concerns particularly deflecting indicating instruments of the light beam type.

It is an object of my invention to provide a compact, sturdy, reliable, easily read, light beam instrument.

It is also an object of my invention to provide a light beam instrument so arranged that the surface of the scale may be perpendicular to the axis of rotation of the other elements and yet the utmost compactness may be obtained.

Another object is to obviate the necessity for supplemental mirrors. Still another object is to obtain high brilliancy and sharpness of definition of the light spot without using expensive elements.

Other objects and advantages of the invention will become apparent as the description proceeds.

In accordance with my invention in its preferred form I utilize a rotatable element bearing a mirror upon which a beam of light is cast by a suitable source in the usual manner, but instead of having a reflected beam fall directly upon the scale I provide a bent prism which extends at least partially along a circle around the axis of rotation of the movable element, which has a side surface perpendicular to the axis of rotation with a scale marked thereon, and which has an inner surface at which the reflected light beam enters.

The invention will be understood more readily from the following detailed description when considered in connection with the accompanying drawing, and those features of the invention which are believed to be novel and patentable will be pointed out in the claims appended hereto.

In the drawing Fig. 1 is a schematic diagram showing a plan view of the scale of the instrument and the prism on which it is marked and representing the other portions of the instrument schematically, Fig. 2 is an elevation of a modified form of the instrument with the internal mechanism partially shown in full, and Figure 3 is a perspective view of the embodiment of Figure 1. Like reference characters are utilized throughout the drawing to designate like parts.

Referring more in detail to the drawing, there is a source of light 1 over which a diaphragm 2 may be placed for the purpose of producing a narrow light beam for forming a well defined light spot, a condensing lens 3 for the purpose of concentrating the light beam 4, and a rotatable mirror 5 carried upon the rotatable element (not shown) having an axis of rotation 5'. A reflected beam 6 enters the inner surface 7 of a substantially curvilinear prism 8 having a reflecting surface 8' reflecting the beam 6 and causing it to emerge from the side surface 9 of the prism 8. The side surface 9 of the bent or curvilinear prism 8 may be in the plane 10 of the scale of the instrument. In this case the side surface 9 of the prism 8 is frosted and the emergent light beam 9' produces a light spot 11 serving as indicator or target cooperating with a scale 12 which may be marked on the side surface 9 of the prism 8. It will be understood that the apparatus is preferably mounted within a suitable protective casing having a window through which the scale 12 may be viewed.

Although I have referred to the arrangement in which the side surface 9 of the prism 8 is frosted and has a scale marked thereon, it will be understood that my invention is not limited to this arrangement and if desired, I may provide a prism 8 with a clear side surface 9 spaced from the side of a casing 13 in which there is a window 14. In this case I provide a scale of translucent material mounted on the back surface 15 of the window 14.

The prism 8 may be composed of any suitable transparent material such as glass, or a transparent resin may be employed, if desired, for the purpose of providing less expensive and less fragile instruments. Among the resins which may be used for this purpose are a synthetic resin manufactured by Rohm & Haas Co., Inc., under the trade name "Plexiglass" and a resin manufactured by the du Pont de Nemours Co. under the trade name "Pontalite", which I believe to be polymeric esters, largely polymethyl methacrylate. Such prisms, though inexpensive to mold and make from relatively inexpensive material, provide high optical accuracy so as to give sharp definition and high brilliancy of the light spot.

In referring to the use of a frosted surface at the front face 9 of the prism 8, and in referring to frosting the scale at the back of the window 14 or making it translucent, it will be understood that I refer to any suitable treatment of a sheet of light transmitting material or its surface for causing an emergent light beam to produce a light spot. For example, the surface 9 may be ground glass or it may be composed of a separate sheet of opal glass or it may be what is known as flashed opal. In flashed opal a thin coating of a dense mixture of dense particles is flashed upon a body work of clear glass to produce a translucent frosting. In case a clear surface prism is used, a translucent scale plate which is composed either of ground glass or opal glass or a suitable transparent resin may be employed. In the description and in the claims therefore, I utilize the phrase "frosted" to refer to any suitable treatment for making the surface of the transparent body or a layer thereof translucent instead of transparent.

In the drawing I have shown the prism 8 as having circular surfaces formed (in the mathematical sense) by rotating a triangle around the axis of rotation 5' of the movable element. It will be understood that the invention is not limited to the use of strictly circular bent prisms but that it includes the use of prisms curved in any suitable manner to cooperate with the movement of the light beam reflected by the movable mirror. For example, if desired, an ellipsoidal or parabolic curved prism might be employed where it was desired to change the shape of the scale or to modify the scale distribution. Likewise, for the purpose of modifying the scale distribution I may, in certain cases, mount the bent prism so to be eccentric with the axis of rotation of the movable mirror 5.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to obtain by Letters Patent of the United States is:

1. A measuring instrument comprising a rotatable element carrying a mirror, a source of light projecting a beam against said mirror, and a curvilinear prism having an axis substantially coincidental with the axis of rotation of the rotatable element, having an inner surface and having a frosted side surface, said prism being so located with respect to the light source that a beam of light reflected from said mirror enters the said inner surface and emerges from said side surface, the frosted surface of said prism having scale markings thereon.

2. A deflecting instrument comprising a rotatable element carrying a mirror, means for projecting a beam of light against said mirror, and a prism curved to extend at least partially around the axis of rotation of the movable element, having an inner surface toward the mirror and a frosted side surface transverse to the axis of rotation of the movable element and being so arranged that a beam of light reflected from the mirror enters the inner surface and emerges from said side surface.

3. A measuring instrument comprising a rotatable element carrying a mirror, means for projecting a beam of light against said mirror, a prism curved to extend partially around the axis of rotation of the movable element, said prism having an inner surface toward the mirror and a side surface transverse to the axis of rotation of the movable element and being so arranged that a beam of light reflected from the said mirror enters the inner surface and emerges from said side surface, a scale in front of the prism having a frosted surface and scale markings thereon.

4. In a measuring instrument of the light beam type, a rotatable mirror, means for projecting a beam of light against said mirror and a curvilinear prism extending partially around the axis of rotation of the rotatable mirror, said prism having an inner surface toward the mirror and a side surface transverse to the axis of rotation of the mirror, said prism being so arranged that a beam of light reflected from the mirror enters the inner surface of the prism and emerges from the said side surface.

WALTER LANGE.